Figure 2:
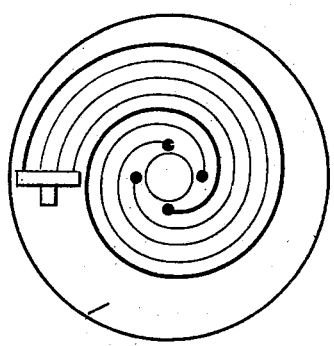

No. 620,312. Patented Feb. 28, 1899.
W. HAMPSON.
APPARATUS FOR SEPARATING MIXED GASES BY REFRIGERATION, ESPECIALLY APPLICABLE TO SEPARATION OF OXYGEN FROM AIR.
(Application filed Oct. 10, 1896.)
(No Model.) 2 Sheets—Sheet 1.
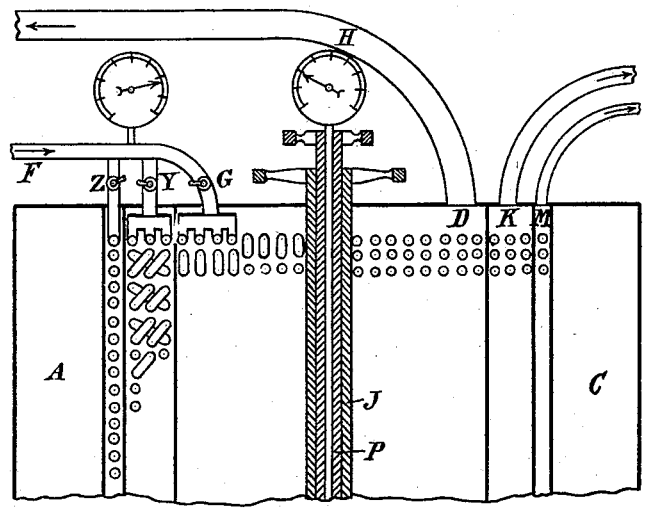
Fig. 1.
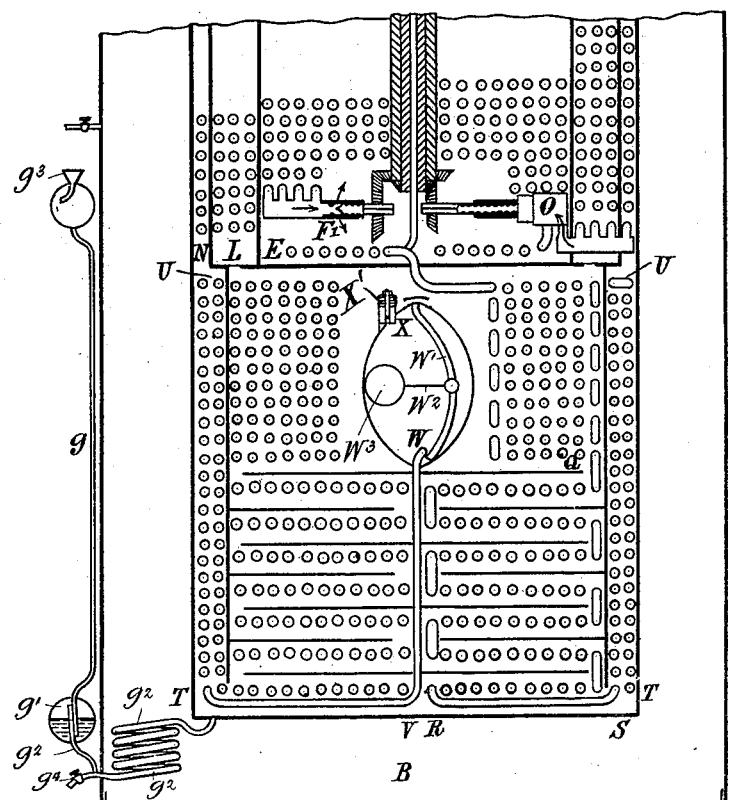
Witnesses
Inventor No. 620,312. Patented Feb. 28, 1899.
W. HAMPSON.
APPARATUS FOR SEPARATING MIXED GASES BY REFRIGERATION, ESPECIALLY APPLICABLE TO SEPARATION OF OXYGEN FROM AIR.
(Application filed Oct. 10, 1896.)

(No Model.) 2 Sheets—Sheet 2.

UNITED STATES PATENT OFFICE.

WILLIAM HAMPSON, OF LONDON, ENGLAND.

APPARATUS FOR SEPARATING MIXED GASES BY REFRIGERATION, ESPECIALLY APPLICABLE TO SEPARATION OF OXYGEN FROM AIR.

SPECIFICATION forming part of Letters Patent No. 620,312, dated February 28, 1899.

Application filed October 10, 1896. Serial No. 608,500. (No model.)

*To all whom it may concern:*

Be it known that I, WILLIAM HAMPSON, M. A., Oxford, a subject of the Queen of Great Britain, residing at 140 Minories, London, England, have invented certain new and useful Apparatus for Separating Mixed Gases by Refrigeration, Especially Applicable to the Separation of Oxygen from Air, of which the following is a specification.

According to my invention I cause compressed gas after passing through pipes or passages and after being in any suitable way expanded and thereby made colder to pass back over the surfaces of the said pipes or passages through such a length as to interchange the temperatures of the compressed gas approaching the expansion-point and the expanded gas passing away from it, so that each succeeding portion of compressed gas is cooled before expansion, and this renders colder the next portion of expanded gas, and so on, thereby intensifying the cold. This is what I call the "primary system" or "primary apparatus," which I use in connection with another system, which I call the "secondary system" or "secondary apparatus," in which I employ pipes, which I call the "liquefaction-pipes," within which the mixed gases to be separated pass to the neighborhood of the expansion-point in the primary apparatus, so as to be exposed to the cold produced by the expansion in the primary apparatus.

In order that the gases in the liquefaction-pipes may liquefy and remain liquid at a higher temperature than the expanded gas in the primary apparatus, I maintain those gases at a higher pressure than that of the said expanded gas. If the gases to be liquefied are the same as those which circulate in the primary apparatus—as, for example, when both are atmospheric air—the mixed gases to be separated are conveniently supplied from the high-pressure supply of the primary apparatus through a reducing-valve. From the neighborhood of the expansion-point the liquefaction-pipes pass through what I call the "vaporization vessels" and end in one of those vessels at a liquid-separator, which allows liquid, but not gas, to escape from the liquefaction-pipes. The liquid accumulates in such vaporization vessel under atmospheric pressure, at which pressure its more volatile constituents begin to boil off or vaporize. The liquid becoming colder causes the liquefaction of a further portion of gases within the liquefaction-pipes, while, on the other hand, the heat withdrawn from the liquefaction-pipes promotes the vaporization of the more volatile of the liquefied gases surrounding them. From the first vaporization vessel the liquid passes into another or others arranged in series. These also contain a portion of the aforesaid liquefaction-pipes. By this arrangement the liquid as it passes through the additional vessels has a further portion of its more volatile components boiled off until in the last vessel it is sufficiently purified. The amount of boiling off, and therefore the extent to which the separation is carried, depends on the pressure maintained in the liquefaction-pipes, which is easily regulated. The purified liquid may be drawn off by a pipe from the bottom of the last vaporization vessel or as a gas from the top thereof.

Figure 3:
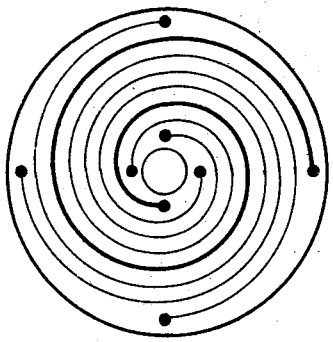
Figure 4:
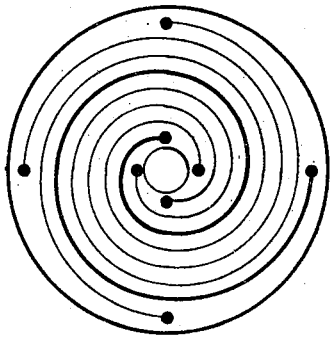

In the accompanying drawings, Figure 1 shows a sectional elevation of my improved apparatus arranged for separating oxygen from air. Figs. 2, 3, and 4 are diagrams showing in plan the arrangement of the circulating-pipes within the apparatus. Fig. 2 shows a plan view in diagram of the top layer of pipes. Fig. 3 shows a view of the second layer, and Fig. 4 a view of the third layer, of pipes in the chamber D E.

In the figures to avoid confusion each pipe is represented by a single line instead of two parallel lines. One of the pipes is distinguished from the others by the thickness of the line, so that its course may be more readily traced, the coils being arranged layer beneath layer from top to bottom, and they are arranged fourfold in a spiral coil terminating at the lower end of the chamber D E in the orifice at F'.

A B C is the heat-proof jacketing, shown in the drawings as a vacuum.

D E is the primary exchanger. This is entered at the top by the pipe F G, which contains air freed from the vapor of water and carbonic acid and at high pressure. In the apparatus the pipe F G divides into branches provided with separate regulating - cocks, which branches pass in successive spiral layers from the top to near the bottom of the primary exchanger D E. Near the bottom of the exchanger the pipes unite again and end in the orifice F', which is controlled by a conical plug regulated by a pinion turned by the outer cylindrical rod J. The compressed air when it escapes by the orifice F' expands, and the expanded cooled air flows over the pipes of compressed air on its way back to the top of the exchanger, from which it issues by the pipe D H, which leads it back to the compressor.

K L is a chamber inclosing D E and inclosed by M N, both concentrically. K L and M N contain pipes disposed like those in D E and supplied with compressed air from the same pipe F G; but when they unite at the bottom of the concentric chambers the compressed air from them passes to a reducing-valve O. The reducing-valve is of a well-known type, in which the pressure at the exit side of the valve causes the valve to be closed as soon as this pressure is able to overcome an adjustable spring. The spring is regulated by a pinion turned by the inner cylindrical rod P. The reducing-valve is regulated so that the pressure of the air in the pipe beyond it is such as to make it liquefy near the temperature at which oxygen vaporizes under atmospheric pressure, which temperature is hereinafter denoted by the letters $t\,v\,o$, (signifying the temperature of the vaporization of oxygen,) the pressure under which air liquefies at this temperature being denoted by the letters $p\,l\,a\,t\,v\,o$ (signifying the pressure of liquefaction of air at $t\,v\,o$) and the highest pressure of the compressed air by the letters $p\,a\,c$, (signifying pressure to which air is compressed.) The pressure $p\,l\,a\,t\,v\,o$ in the pipe beyond the reducing-valve is indicated by a pressure-gage attached to a pipe which passes through the inner cylindrical rod P and the pressure $p\,a\,c$ by a gage attached to the pipe F G.

The pipe beyond the reducing-valve forms the liquefaction-coils. These are arranged as spirals in the lower part of the primary exchanger D E. Then passing through the floor of this exchanger into the first nitrogen-vaporization vessel L Q they form successive spirals in the outer part of this vessel from the top to the bottom, whence they pass successively through further compartments or vaporization vessels to R and S, thence to the top U, and back again to the bottom T of the oxygen-vaporization vessel U T, thence to V, and finally to W, where they discharge into a liquid-separator W X so arranged as to let liquid, but not vapor, pass out at X.

The liquid-separator W X is an egg-shaped vessel with a safety-valve X' upon it which in normal working is inoperative. The spiral pipe which enters this vessel terminates at the bottom thereof and delivers liquid into it. There is an outlet-pipe W' within the vessel W X. It is open at the lower end and at the upper end delivers to the exterior of the vessel. There is a ball-cock $W^2$ on the delivery-pipe, which normally remains closed, so that nothing can pass out until sufficient liquid has accumulated to float the ball $W^3$.

When the compressor is working, the pipe F delivers to the pipes G Y Z air under the high pressure $p\,a\,c$, from which pressure some of the air entering by G expands at F' to atmospheric pressure, being thereby cooled; but the air which enters by Y and Z expands at the reducing-valve to the pressure $p\,l\,a\,t\,v\,o$, which then exists all along the liquefaction-coils and in the liquid-separator. No more air then passes the reducing-valve. The self-intensive refrigeration goes on in the primary exchanger D E until the temperature of the expanded air at the bottom of it reaches $t\,v\,o$, which is about 180° centigrade. At this temperature the air in the liquefaction-coils at the level E, being freely exposed to it, begins to liquefy under the pressure $p\,l\,a\,t\,v\,o$. The latent heat which it gives out in liquefying prevents the temperature falling further, so that the temperature for the liquefaction of air under atmospheric pressure, about 190° centigrade, is never reached, and therefore the expanded air from F does not liquefy. The liquefaction of air in the liquefaction-coils reduces the pressure therein, and the reducing-valve then allows more air to pass until the pressure is raised again to $p\,l\,a\,t\,v\,o$. When sufficient liquid air has collected in the liquefaction-coils to pass on to the liquid-separator and sufficiently accumulates there it begins to be discharged from X, and so to pass from the pressure $p\,l\,a\,t\,v\,o$ to atmospheric pressure. This permits a great quantity of the nitrogen to boil off and so cool the liquid which is left, and which consists largely of oxygen; but this reduction of temperature is stopped by the liquefaction of more air at the reduced temperature in the liquefaction-coils in the neighborhood. Thus the vaporization of nitrogen and the liquefaction of air promote each other. The liquid as it descends the compartments successively from Q to S is continually freed from more nitrogen, which passes upward, so that only very pure oxygen reaches S and begins to fill the oxygen-vaporization vessel U T.

The escaping nitrogen passes up through the secondary exchanger K L, and the oxygen is withdrawn as a gas or vapor through the secondary exchanger M N, its vaporization under a pressure somewhat below atmospheric being promoted by the liquefaction of more air in the outer liquefaction-coils, from which liquefaction the latent heat for the vaporization is obtained. The level of the liquid oxygen in the vaporization vessels is shown by a gage containing a solution of the same density—1.1375.

The gage $g$ is a very simple contrivance. Its object is to show the level at which the liquid oxygen stands in the vessel T U. As shown, a glass barometer-tube enters at the lower end a small globular vessel $g'$, containing any liquid, but preferably one of about the same specific gravity as liquid oxygen. A pipe $g^2$ connects the vessel with the vessel T U, so as to admit to it oxygen (which then is gaseous) at a pressure equivalent to the head of liquid in the vessel T U. The liquid standing in the barometer-tube indicates this pressure. At the top of the barometer-tube is a funnel for pouring in the liquid.

The oxygen may be drawn off as a liquid at T through a pipe $g^2$ $g^4$ long enough to prevent conduction of heat to the vaporization vessel. As a precaution against accident a safety-valve X' is provided upon the liquid-separator W X. The temperature-exchangers being concentrically arranged, they present only one external surface liable to convey external heat inward.

The newly-liquefied air is, it will be seen, prevented from mingling with the liquid which has already been purified by continuous boiling. This adds greatly to the completeness of the purification.

The nitrogen which is boiled off is not allowed to mingle with the air circulating in the apparatus, but a separate temperature-interchanger is provided for it, so that it may be at once rejected.

The arrangement above described of the reducing-valve, liquefaction-coils, and vaporization vessels is such that the temperatures and quantities of air, gases, and liquids are automatically controlled without further assistance than the regulation of the reducing-valve.

What I claim is—

1. The combination of a primary cooling system, means for supplying it with gas under pressure, means for effecting the escape and expansion of the gas and the exchange of temperatures between the expanding and the incoming compressed gas; a secondary system, means for supplying it with mixed gases under pressure and from a source other than the primary system, for cooling and liquefying these gases under their pressure by the cold produced in the primary system, and for effecting the separation or boiling off of one of the gases from the liquefied gas in the secondary system.

2. The combination of a primary system, means for supplying it with gas under pressure, means for effecting the escape and expansion of the gas in the primary system and the exchange of temperatures between the expanding and the incoming compressed gas, a secondary system, a reducing-valve in the secondary system, means for supplying said system with mixed gases and for cooling these gases by the cold produced in the primary system, whereby the gases of the secondary system are liquefied therein, and means for effecting the separation or boiling off of one of the gases from the liquefied gas in the secondary system.

3. The combination of a primary system in which cold is produced by the expansion of compressed gas, a secondary system, means for supplying it with compressed gas, a reducing-valve in the secondary system for allowing the compressed gas to expand to a lower pressure, and means for liquefying the gas in the secondary system by cold produced in the primary system.

4. The combination of a primary system in which cold is produced by the expansion of compressed gases, a secondary system to which compressed gases are supplied, which is refrigerated by the expansion of the gases of the primary system and in which the compressed gases of the secondary system are liquefied, a vaporizing-chamber into which the liquefied gases are discharged, and a temperature-exchanger connected therewith in which the said secondary system is located and through which passes the gas boiled off from the liquefied gases in the vaporizing-chamber.

5. The combination of a primary system in which cold is produced by the expansion of compressed gas, a secondary system in which gas is liquefied by cold produced in the primary system, means for discharging liquid from the circulating-pipes of the secondary system, and a vaporizing-chamber composed of several compartments, which the liquefied gas traverses while boiling, and in one or more of which the incoming coil or pipe of the secondary system is located.

6. The combination of a primary system, means for supplying it with gas under pressure, means for effecting the escape and expansion of the gas, and exchange of temperatures between the expanding and the incoming gas, a secondary system, means for supplying it with mixed gases, for cooling these gases by the cold produced in the primary system and for effecting the separation or boiling off of one or more of the gases in the secondary system, and a temperature-exchanger through which the incoming and outgoing gases in the secondary system pass, and which surrounds the temperature-interchanger of the primary system.

7. The combination, substantially as set forth, of a primary system, consisting of a pipe-coil system adapted to receive at one point air or other gas under pressure and having a discharge-orifice therefor at another point through which the compressed gas emerges and expands, the arrangement being such that the pipe-coil system is refrigerated by the expanding gas; a secondary system, consisting of a pipe-coil system to which air or other gas is admitted under pressure and which is refrigerated by the expanding gas of the primary system, and a liquefying pipe-coil system into which the gas so supplied to the secondary system is expanded and then liquefied under the temperature and pressure existing therein, and a vaporizing-chamber into which the liquefied gas is discharged and in which the liquefying pipe-coil is arranged and in which the more volatile constituents of the liquid boils off, thereby refrigerating such coil.

8. The combination, substantially as set forth, of a primary system, consisting of a pipe-coil system adapted to receive at one point air or other gas under pressure, and having a discharge-orifice therefor at another point through which the compressed gas emerges and expands, the arrangement being such that the pipe-coil system is refrigerated by the expanding gas; a secondary system, consisting of a pipe-coil system to which air or other gas is admitted under pressure and which is refrigerated by the expanding gas of the primary system, and a liquefying pipe-coil system into which the gas so supplied to the secondary system is expanded and then liquefied under the temperature and pressure existing therein; and a series of connected vaporizing-chambers arranged one above another and within which the liquefying pipe-coil is arranged; an outlet from said coil to discharge the liquefied gas into the upper chamber, and means for withdrawing the residual liquid or gas from the lower vaporizing-chamber.

9. The combination, substantially as set forth, of a primary system, consisting of a pipe-coil adapted to receive at one point air or other gas under pressure and having a discharge-orifice therefor at another point, through which the compressed gas emerges and expands, the arrangement being such that the pipe-coil is refrigerated by the expanding gas; a secondary system, consisting of a pipe-coil to receive air or other gas under pressure and which is refrigerated by the expanding gas of the primary system, and a liquefying pipe-coil connected with said pipe-coil of the secondary system through a reducing-valve and also cooled by the expanding gas of the primary system; and a vaporizing-chamber in which the liquefying-coil is disposed; a separator X W in which the liquefying-coil terminates, and from which liquefied gas is delivered into the vaporizing-chamber where some of the gas boils off, further cooling the liquefying-coil.

10. In combination with an apparatus in which air or other gas is liquefied under the influence of temperature and pressure, of a series of connected vaporizing-chambers arranged one above the other, in which the liquefying pipe-coil of the apparatus is located and into the upper one of which chambers, the liquefied gas is discharged, and into the lower one of which it descends, whereby the gas is boiled off from said liquid, thereby refrigerating the liquefying pipe-coil, and the purer residual liquid collected in the last of said chambers.

WILLIAM HAMPSON.

Witnesses:
DEANSTON CARPMAEL,
FRED C. HARRIS.